(12) United States Patent
Park et al.

(10) Patent No.: US 10,114,447 B2
(45) Date of Patent: Oct. 30, 2018

(54) IMAGE PROCESSING METHOD AND APPARATUS FOR OPERATING IN LOW-POWER MODE

(71) Applicant: SAMSUNG ELECTRONICS CO., LTD., Suwon-si (KR)

(72) Inventors: Jong-pil Park, Goyang-si (KR); Sang-jun Ahn, Seongnam-si (KR); Jang-won Lee, Suwon-si (KR); Soo-ryum Choi, Suwon-si (KR); Chan-min Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 10 days.

(21) Appl. No.: 15/364,979

(22) Filed: Nov. 30, 2016

(65) Prior Publication Data

US 2017/0168687 A1    Jun. 15, 2017

Related U.S. Application Data

(60) Provisional application No. 62/265,613, filed on Dec. 10, 2015.

(30) Foreign Application Priority Data

Aug. 30, 2016    (KR) .................. 10-2016-0111072

(51) Int. Cl.
| | | |
|---|---|---|
| *G06T 17/00* | (2006.01) | |
| *G06F 1/32* | (2006.01) | |
| *G06T 15/04* | (2011.01) | |
| *G09G 5/391* | (2006.01) | |
| *G06T 15/00* | (2011.01) | |
| *G06T 17/20* | (2006.01) | |

(52) U.S. Cl.
CPC ............ *G06F 1/3265* (2013.01); *G06T 15/00* (2013.01); *G06T 15/04* (2013.01); *G06T 17/20* (2013.01); *G06T 2210/36* (2013.01); *G09G 5/391* (2013.01); *Y02D 10/153* (2018.01)

(58) Field of Classification Search
CPC ......... G06T 17/20; G06T 15/00; G06T 15/04; G06T 2210/36; G09G 5/391; G06F 1/3265
See application file for complete search history.

(56) References Cited

U.S. PATENT DOCUMENTS

| | | | |
|---|---|---|---|
| 6,011,635 A * | 1/2000 | Bungo .................. | H04N 1/387 358/463 |
| 6,285,798 B1 * | 9/2001 | Lee ........................ | G06T 5/004 382/260 |
| 7,053,939 B2 * | 5/2006 | Lin ..................... | H04N 1/00795 348/239 |
| 8,373,728 B2 | 2/2013 | Ozawa et al. | |
| 8,706,911 B2 | 4/2014 | You et al. | |
| | | (Continued) | |
| 8,958,658 B1 * | 2/2015 | Lim ........................ | G06T 5/40 382/274 |
| 9,257,066 B2 * | 2/2016 | Roh ..................... | G09G 3/2003 |

*Primary Examiner* — Abderrahim Merouan
(74) *Attorney, Agent, or Firm* — Sughrue Mion, PLLC

(57) ABSTRACT

Provided are an image processing apparatus and method for decreasing an amount of power consumed to display an image. The image processing apparatus includes: an input interface configured to input image data; at least one processor configured to obtain an output pixel value by adjusting at least one selected from luminance, resolution, and precision regarding a portion of the image data; and an output interface configured to output image data including the obtained output pixel value.

11 Claims, 7 Drawing Sheets

(56) References Cited

U.S. PATENT DOCUMENTS

| | | | | |
|---|---|---|---|---|
| 9,692,964 B2* | 6/2017 | Steinberg | | H04N 5/23229 |
| 2003/0059116 A1* | 3/2003 | Kupeev | | G06K 9/4638 |
| | | | | 382/203 |
| 2006/0284822 A1* | 12/2006 | Kerofsky | | G09G 3/3406 |
| | | | | 345/102 |
| 2007/0201740 A1* | 8/2007 | Kuwata | | G06T 11/60 |
| | | | | 382/162 |
| 2008/0032754 A1* | 2/2008 | Kim | | G09G 3/20 |
| | | | | 455/574 |
| 2008/0062208 A1* | 3/2008 | Tada | | G09G 3/2007 |
| | | | | 345/690 |
| 2010/0091029 A1* | 4/2010 | Han | | G06T 5/008 |
| | | | | 345/589 |
| 2010/0182332 A1 | 7/2010 | Ozawa et al. | | |
| 2010/0315444 A1* | 12/2010 | Mori | | G09G 3/22 |
| | | | | 345/690 |
| 2012/0013649 A1* | 1/2012 | Higashi | | G09G 3/3426 |
| | | | | 345/690 |
| 2013/0120475 A1* | 5/2013 | Katsu | | G09G 3/3426 |
| | | | | 345/690 |
| 2014/0247870 A1* | 9/2014 | Mertens | | H04N 19/46 |
| | | | | 375/240.08 |
| 2015/0070531 A1* | 3/2015 | Ikefuji | | G01N 21/253 |
| | | | | 348/234 |
| 2015/0194091 A1* | 7/2015 | Tusch | | G09G 3/3283 |
| | | | | 345/690 |
| 2016/0116294 A1* | 4/2016 | Raghu | | G01C 21/34 |
| | | | | 701/23 |
| 2017/0103711 A1* | 4/2017 | Kamio | | G09G 3/3406 |
| 2017/0155835 A1* | 6/2017 | Ikefuji | | H04N 5/23235 |

* cited by examiner

IMAGE PROCESSING METHOD AND APPARATUS FOR OPERATING IN LOW-POWER MODE

CROSS-REFERENCE TO RELATED APPLICATIONS

This application claims the benefit of U.S. Provisional Patent Application No. 62/265,613, filed on Dec. 10, 2015, in the U.S. Patent and Trademark Office, and priority from Korean Patent Application No. 10-2016-0111072, filed on Aug. 30, 2016, in the Korean Intellectual Property Office, the disclosures of which are incorporated herein in their entirety by reference.

BACKGROUND

1. Field

Apparatuses and methods consistent with exemplary embodiments relate to image processing methods and apparatuses for operating in a low-power mode, and more particularly, to image processing methods and apparatuses for decreasing at least one among luminance, resolution, and precision of an image to be displayed and reducing a decrease in visibility in a low-power mode by applying a filter.

2. Description of the Related Art

With the development of technology related to mobile devices such as smartphones, users may watch content, such as games, movies/videos, and virtual reality images, through their mobile devices.

The low-power mode of mobile devices refers to a mode for decreasing power that is used to execute applications for reproducing virtual reality images or movies/videos. In particular, considering that the amount of power consumed for display makes up a large part of the overall power consumption of a device, research into the low-power mode for decreasing the amount of power that is used for display has been actively conducted.

The power consumed to display an image changes according to a luminance (i.e., degree of brightness) of an image to be displayed. Accordingly, the low-power mode may be implemented by decreasing the luminance of an image or a particular color component of an image. However, if the luminance of the image uniformly decreases, quality of an image to be displayed may decrease, or a boundary portion between objects present in the image or between an object and the background, for example, an edge portion, may become harder to perceive clearly, thus decreasing picture quality.

SUMMARY

One or more exemplary embodiments provide image processing apparatuses and methods for improving image quality and decreasing an amount of power consumed to display an image.

One or more exemplary embodiments also provide non-transitory computer-readable recording media having recorded thereon a program for performing, when executed by a computer, the above methods.

Additional aspects will be set forth in part in the description which follows and, in part, will be apparent from the description, or may be learned by practice of the exemplary embodiments.

According to an aspect of an exemplary embodiment, there is provided an image processing apparatus including: an input interface configured to receive an input of image data; at least one processor configured to obtain an output pixel value by adjusting at least one selected from luminance, resolution, and precision regarding a portion of the image data; and an output interface configured to output image data including the obtained output pixel value.

The at least one processor may be further configured to adjust a tone curve denoting a correlation between input pixel values and output pixel values, and based on the adjusted tone curve, obtain, with regard to at least one pixel in the image data, an output pixel value corresponding to an input pixel value.

The at least one processor may be further configured to select a partial range from among an entire range of input pixel values of the tone curve, changing an output pixel value corresponding to an input pixel value in the selected partial range, and not changing an output pixel value corresponding to an input pixel value in a range that is not selected.

The selected partial range may include input pixel values greater than or equal to a reference value.

The at least one processor may be further configured to adjust the tone curve to be non-linear.

The at least one processor may be further configured to decrease a rendering resolution or a texture resolution regarding the portion of the image data.

The at least one processor may be further configured to decrease a number of vertexes constituting an object present in the portion of the image data.

The at least one processor may be further configured to apply a filter, for enhancing an edge of at least one object present in the image data, to the image data including the obtained output pixel value.

According to an aspect of another exemplary embodiment, there is provided an image processing method including: receiving an input of image data; obtaining an output pixel value by adjusting at least one selected from luminance, resolution, and precision regarding a portion of the image data; and outputting image data including the obtained output pixel value.

The obtaining of the output pixel value may include: adjusting a tone curve denoting a correlation between input pixel values and output pixel values, and based on the adjusted tone curve, obtaining, with regard to at least one pixel in the image data, an output pixel value corresponding to an input pixel value.

The obtaining of the output pixel value corresponding to the input pixel value of the at least one pixel in the image data may include: selecting a partial range from among an entire range of input pixel values of the tone curve, changing an output pixel value corresponding to an input pixel value in the selected partial range, and not changing an output pixel value corresponding to an input pixel value in a range that is not selected.

The selected partial range may include input pixel values greater than or equal to a reference value.

The obtaining of the output pixel value corresponding to the input pixel value of the at least one pixel in the image data may include: adjusting the tone curve to be non-linear and obtaining, based on the non-linear tone curve, the output pixel value.

The obtaining of the output pixel value may include: decreasing a rendering resolution or a texture resolution regarding the portion of the image data.

The obtaining of the output pixel value may include: decreasing a number of vertexes constituting an object present in the portion of the image data.

The obtaining of the output pixel value may include: applying a filter, for enhancing an edge of at least one object present in the image data, to the image data including the obtained output pixel value.

According to an aspect of another exemplary embodiment, there is provided non-transitory computer-readable recording medium having recorded thereon a program for performing, when executed by a computer, performs the image processing method.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
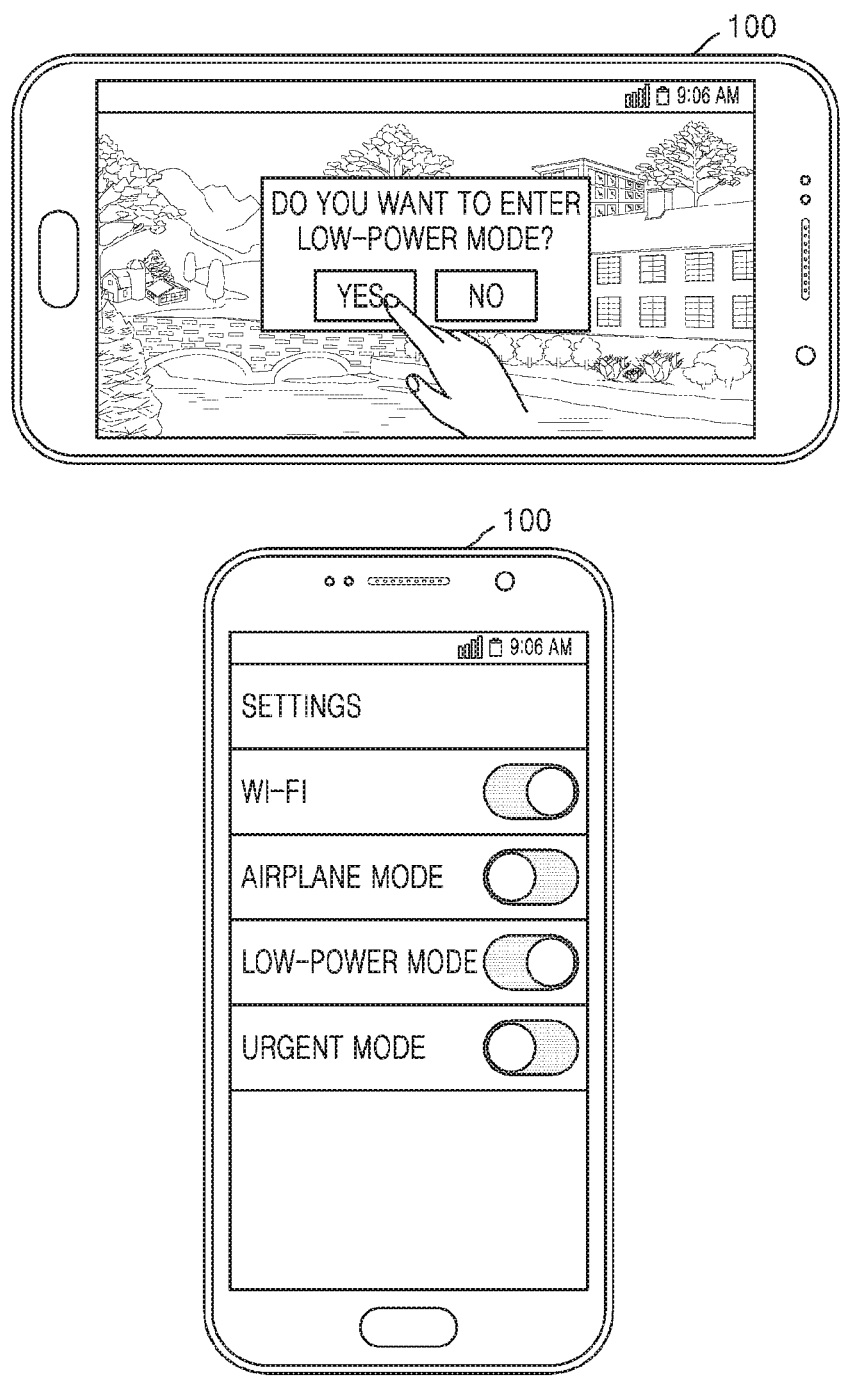
FIG. 1 illustrates an environment in which a multimedia apparatus may enter a low-power mode, according to an exemplary embodiment.

Hereinafter, exemplary embodiments will be described in detail with reference to the accompanying drawings. Advantages and features, and methods of accomplishing the same may be understood more readily by reference to the following description of exemplary embodiments and the accompanying drawings. However, the exemplary embodiments may have different forms and should not be construed as being limited to the descriptions set forth herein. Rather, these exemplary embodiments are provided to fully convey the scope of the present disclosure to one of ordinary skill in the art, and the inventive concept is defined by the scope of claims. The terms used herein are selected from among general terms that are currently widely used in consideration of their functions. However, the terms may be different according to an intention of one of ordinary skill in the art, a precedent, or the advent of new technology. Also, in particular cases, the terms are discretionally selected by the applicant, and the meaning of those terms will be described in detail in the corresponding part of the detailed description. Accordingly, the terms used herein are not merely designations of the terms, but the terms are defined based on the meaning of the terms and content throughout the present specification. Reference will now be made in detail to exemplary embodiments, examples of which are illustrated in the accompanying drawings. The exemplary embodiments described and the structure illustrated in the drawings are exemplary and do not represent the entire scope of the present disclosure. Therefore, it should be understood that there can be various equivalents and modified exemplary embodiments that can substitute those described and illustrated herein at the time of the present application filing. Expressions such as "at least one of," when preceding a list of elements, modify the entire list of elements and do not modify the individual elements of the list.

The term "unit" or "module" used herein may refer to a hardware component or circuit such as a field-programmable gate array (FPGA) or an application-specific integrated circuit (ASIC).

FIG. 1 illustrates an environment in which a multimedia apparatus 100 enters a low-power mode, according to an exemplary embodiment.

The multimedia apparatus 100 may be an apparatus that displays image content such as a game, a movie/video, a virtual reality image, a stereoscopic image, etc. For example, the multimedia apparatus 100 may be any one of mobile devices such as a television, a game console, a computer, and a smartphone, but is not limited thereto. For example, a user may execute a game application stored in the multimedia apparatus 100 and view game images on a screen of the multimedia apparatus 100.

The multimedia apparatus 100 according to an exemplary embodiment may perform rendering in order to finally display an image on the screen. Three-dimensional (3D) rendering, which is a type of image rendering, may be used to synthesize data of a 3D model into an image that may be seen at a given viewpoint of a camera. The multimedia apparatus 100 according to an exemplary embodiment may obtain image data that is finally displayed on the screen by using a rasterization technique for generating an image by projecting a 3D model onto a screen, a ray tracing technique for generating an image by tracing a path of light incident along a ray that is emitted from a viewpoint of a camera toward each pixel of an image, etc.

The multimedia apparatus 100 may obtain image data that is finally displayed on the screen, by performing rendering on image data with power supplied from a battery. Considering that the amount of power consumed to display an image makes up a very large part of overall power consumption, the multimedia apparatus 100 may use a low-power mode that controls an image to be displayed.

The multimedia apparatus 100 according to an exemplary embodiment may display on the screen a user interface that asks whether to enter the low-power mode when an amount of battery remaining in the multimedia apparatus 100 is below a certain level. The multimedia apparatus 100 according to an exemplary embodiment may enter the low-power mode when the user sets the low-power mode in settings of the multimedia apparatus 100. The multimedia apparatus 100, according to an exemplary embodiment, may automatically enter the low-power mode when an amount of battery that remains is below a predetermined level, or a specific application that uses significant battery consumption is executed.

When the multimedia apparatus 100 enters the low-power mode, the multimedia apparatus 100 may decrease luminance of an image that is displayed. For example, the multimedia apparatus 100 may decrease a pixel value of an image that is displayed. The pixel value may refer to a luminance value of a pixel. For example, when a color space of an image is YCbCr (Y: luminance component, Cb and Cr: chrominance components), the pixel value may denote a value of the Y component, and when the color space is RGB (R: red, G: green, B: blue), the pixel value may refer to a value obtained by adding values of the R, G, and B components together and dividing the values by 3. According to an exemplary embodiment, when the pixel value is expressed in 8 bits, the pixel value may be expressed as a gray scale value having a value ranging from 0 to 255.

Hereinafter, increasing the pixel value may refer to increasing luminance of the pixel, and decreasing the pixel value may refer to decreasing luminance of the pixel. Hereinafter, a range of the pixel value may refer to a luminance range or brightness range that may be expressed by the pixel.

Figure 2:
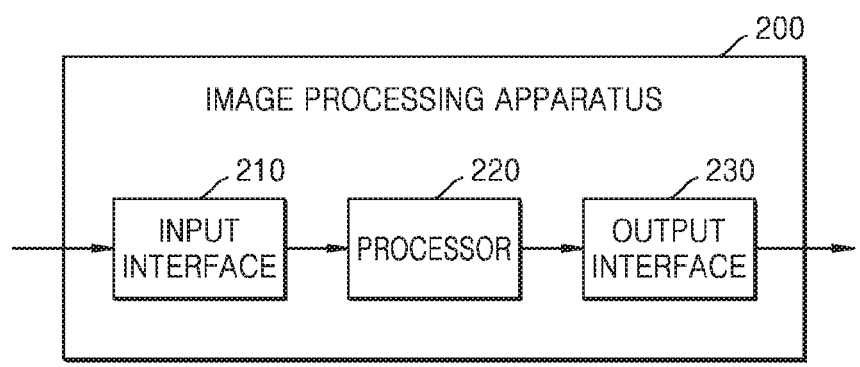
FIG. 2 is a block diagram of an image processing apparatus according to an exemplary embodiment.

FIG. 2 is a block diagram of an image processing apparatus 200 according to an exemplary embodiment.

The image processing apparatus 200, which is an apparatus for a low-power mode of the multimedia apparatus 100, may be located in or outside the multimedia apparatus 100.

The image processing apparatus 200 may include an input interface 210, a processor 220, and an output interface 230.

The input interface 210 may receive an input of image data to be displayed. The image data may include a plurality of pixel values. The input interface 210 according to an exemplary embodiment may store input pixel values regarding pixels constituting an image frame to be displayed currently in a buffer. The image data according to an exemplary embodiment may include, in addition to the input pixel values, at least one of coordinates and the number of vertexes constituting an object of an image, texture data, properties, and geometric information.

The processor 220 may adjust at least one among luminance, resolution, and precision regarding the whole or a portion of an image to be displayed. The processor 220 according to an exemplary embodiment may be an ASIC, an embedded processor, a microprocessor, hardware control logic, a hardware finite-state machine (FSM), a digital signal processor (DSP), or a combination thereof. According to an exemplary embodiment, the processor 220 may include at least one processor.

A region where luminance, resolution, and precision are adjusted may be a specific spatial region of the image or a set of pixels satisfying a predetermined condition. The processor 220 according to an exemplary embodiment may adjust one of luminance, resolution, and precision. The processor 220 according to another exemplary embodiment may adjust at least two of luminance, resolution, and precision. When the processor 220 adjusts at least two of luminance, resolution, and precision, the processor 220 may independently determine regions that are adjusted. For example, the processor 220 may adjust luminance regarding pixels having input pixel values that have luminance equal to or greater than a predetermined reference value, and regardless of the adjusted pixels, may select a spatial region in a predetermined image and adjust resolution regarding the selected region.

The processor 220 according to an exemplary embodiment may decrease luminance of an image to be displayed. The processor 220 according to an exemplary embodiment may adjust a tone curve denoting a correlation between input pixel values and output pixel values, and based on the adjusted tone curve, may obtain, with regard to at least one of pixels included in image data, an output pixel value corresponding to an input pixel value. The obtained output pixel value may be different from the input pixel value corresponding to the output pixel value.

Hereinafter, changing an output pixel value of the tone curve may refer to adjusting a shape of a previously stored tone curve so that an input pixel value and an output pixel value corresponding to the input pixel value may be different from each other. The previously stored tone curve according to an exemplary embodiment may have a shape of a tone curve 310 of FIG. 3 that will be described later. For example, at least one of output pixel values of an adjusted tone curve may be less than or greater than a corresponding input pixel value.

The processor 220 according to an exemplary embodiment may select some input pixel values of a tone curve denoting a correlation between input pixel values and output pixel values and thus, may adjust the tone curve so that output pixel values that correspond to the selected input pixel values may be greater or less than the input pixel values.

The processor 220 according to an exemplary embodiment may select a partial range from among an entire range of input pixel values of a tone curve, and thus, may change an output pixel value corresponding to an input pixel value included in the selected range and may not change an output pixel value corresponding to an input pixel value in a range that is not selected. The selected partial range may include input pixel values equal to or greater than a predetermined reference value.

Figure 3:
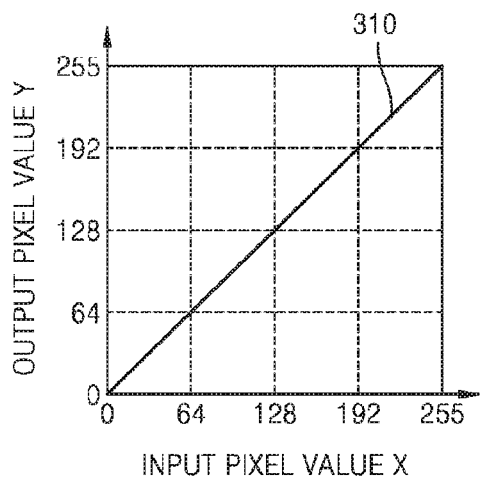
FIG. 3 illustrates adjustment of a tone curve, according to one or more exemplary embodiments.
Figure 3:
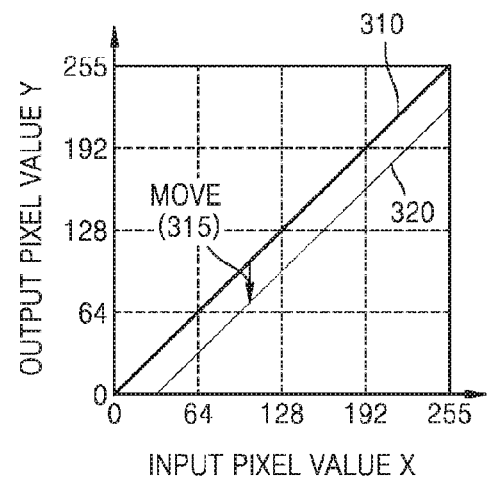
Figure 3:
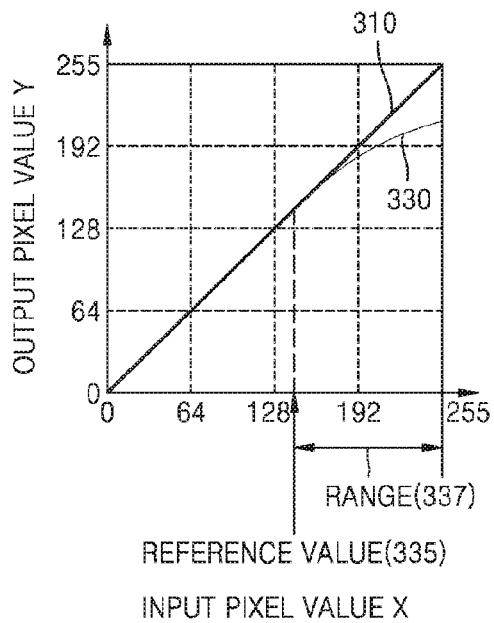
Figure 3:
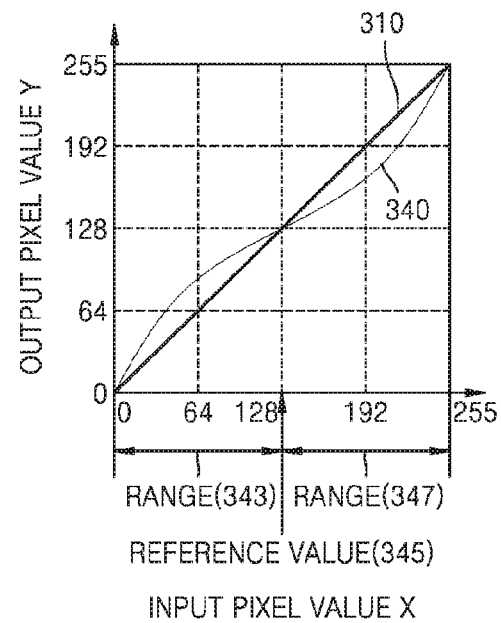

FIG. 3 illustrates tone curves 310, 320, 330, and 340 according to one or more exemplary embodiments, which show a correlation between input pixel values and output pixel values.

The tone curve 310 is a graph showing that, with regard to each input pixel value, an input pixel value and an output pixel value corresponding to the input pixel value are the same as each other. For example, in the case in which a pixel value is expressed in 8 bits, when an input pixel value is 220, an output pixel value corresponding to the input pixel value is also 220. For example, the processor 220 may obtain, based on the tone curve 310, an output pixel value that is the same as an input pixel value. When the processor 220 according to an exemplary embodiment obtains, based on the tone curve 310, an output pixel value, luminance of an image that is displayed does not change.

A tone curve 320 is adjusted by moving (315) the tone curve 310 in a direction of the y-axis. The tone curve 320 shows that an output pixel value is less than an input pixel value corresponding to the output pixel value. For example, when the tone curve 320 is a graph obtained by moving the tone curve 310 in the direction of the y-axis by as much as K, an output pixel value may be less than an input pixel value corresponding to the output pixel value by K. For example, when an input pixel value is 220, an output pixel value corresponding to the input pixel value may be 220−K. That is, with regard to an entire range of input pixel values, the processor 220 according to an exemplary embodiment may obtain, based on the tone curve 320, an output pixel value that is less than an input pixel value. When the processor 220 according to an exemplary embodiment obtains, based on the tone curve 320, an output pixel value, the processor 220 may darken the overall luminance of an output image.

A tone curve 330 shows that, with regard to a partial range selected from among a range of input pixel values, an output pixel value changes. The tone curve 330 is a tone curve adjusted to have a value less than an input pixel value corresponding to an output pixel value corresponding to a range (337) of input pixel values greater than a predetermined reference value (335). Accordingly, an output pixel value obtained based on the tone curve 330 may include an output pixel value less than a corresponding input pixel value. The processor 220 according to an exemplary embodiment may darken, based on the tone curve 330, a portion of an output image corresponding to a partial luminance range.

Compared with when a pixel value of an image having low luminance decreases, a user feels a decrease in visibility less when a pixel value having high luminance decreases. Accordingly, based on the tone curve 330 in which only an output pixel value corresponding to an input pixel value included in a partial luminance range changes, instead of the tone curve 320 in which output pixel values regarding an entire range of input pixel values uniformly decrease, the processor 220 according to an exemplary embodiment may reduce a decrease in visibility.

A tone curve 340 is a tone curve having a non-linear curve shape. The tone curve 340 shows the shape of an 'S' shaped curve. The tone curve 340 has a value less than an input pixel value corresponding to an output pixel value corresponding to a range (347) of input pixel values greater than a predetermined reference value (345). Also, the tone curve 340 may have a value greater than an input pixel value corresponding to an output pixel value corresponding to a range (343) of input pixel values less than the predetermined reference value (345).

For example, based on the tone curve 340, the processor 220 according to an exemplary embodiment may output a brightened pixel value of an image in a low luminance range by increasing an output pixel value and may output a darkened pixel value in a high luminance range by decreasing an output pixel value. The processor 220 according to an exemplary embodiment may obtain, based on a tone curve that is a non-linear curve different from the tone curve 340, an output pixel value.

The processor 220 according to an exemplary embodiment may select a tone curve for obtaining an output pixel value from among a plurality of previously stored tone curves. The processor 220 according to an exemplary embodiment may differently select, according to a type of an application being currently executed or a type of image data that is displayed, a tone curve for obtaining an output pixel value from among a plurality of previously stored tone curves.

Referring to FIG. 2 again, the processor 220 may obtain, based on an adjusted tone curve, an output pixel value regarding at least one of pixels included in image data.

The processor 220 according to an exemplary embodiment may decrease resolution of an image to be displayed. The processor 220 according to an exemplary embodiment may decrease resolution regarding a partial region of an image to be displayed. The processor 220 according to an exemplary embodiment may determine a user non-gazing region and may decrease resolution regarding the determined non-gazing region.

A gazing region is a region including a point at which a person gazes, and the non-gazing region is a region excluding the gazing region. In detail, the gazing region is a region including a point where a person's eyes are focused. The non-gazing region is a region whereby light of an image enters the actual eyes; however, the gazing region may not be perceived because it is beyond a region where a focus is directed. The processor 220 according to an exemplary embodiment may select a region involving few motions as the non-gazing region and may decrease resolution of the selected region. The processor 220 according to an exemplary embodiment may select a block that has a high luminance range and may decrease resolution of the selected block.

The processor 220 according to an exemplary embodiment may decrease a rendering resolution or texture resolution regarding a selected region and may obtain an output pixel value regarding at least one of pixels included in image data.

The processor 220 according to an exemplary embodiment may decrease precision of an image to be displayed. The processor 220 according to an exemplary embodiment may decrease precision regarding a partial region of an image. The processor 220 according to an exemplary embodiment may select a region involving few motions as the non-gazing region and may decrease precision of the selected region. The processor 220 according to an exemplary embodiment may select a block that has a high luminance range and may decrease precision of the selected block.

On selecting a region for decreasing precision, the processor 220 according to an exemplary embodiment may decrease, with regard to an object present in the selected region, the number of vertexes constituting the object to a predetermined number or less and may obtain an output pixel value regarding at least one of pixels included in image data.

In order to reduce a decrease in visibility, an additional image processing algorithm may be applied to image data including an output pixel value obtained by decreasing at least one among luminance, resolution, and precision. This will be described later with reference to FIG. 4.

The output interface 230 may output image data including the obtained output pixel value. The image data including the output pixel value according to an exemplary embodiment may be stored in a buffer, and the image data stored in the buffer may be finally displayed on a screen of the multimedia apparatus 100.

According to an exemplary embodiment, the image processing apparatus 200 is shown as including the input interface 210, the processor 220, and the output interface 230. However, the image processing apparatus 200 may include only the processor 220. For example, the processor 220 of the image processing apparatus 200 may receive an input of data for image processing, may adjust, with regard to the input image data, at least one among luminance, resolution, and precision for operating in a low-power mode, according to the above-described exemplary embodiment, and may output the adjusted image data. An additional image filter that will be described later with reference to FIG. 4 may be applied to the adjusted image data.

Figure 4:
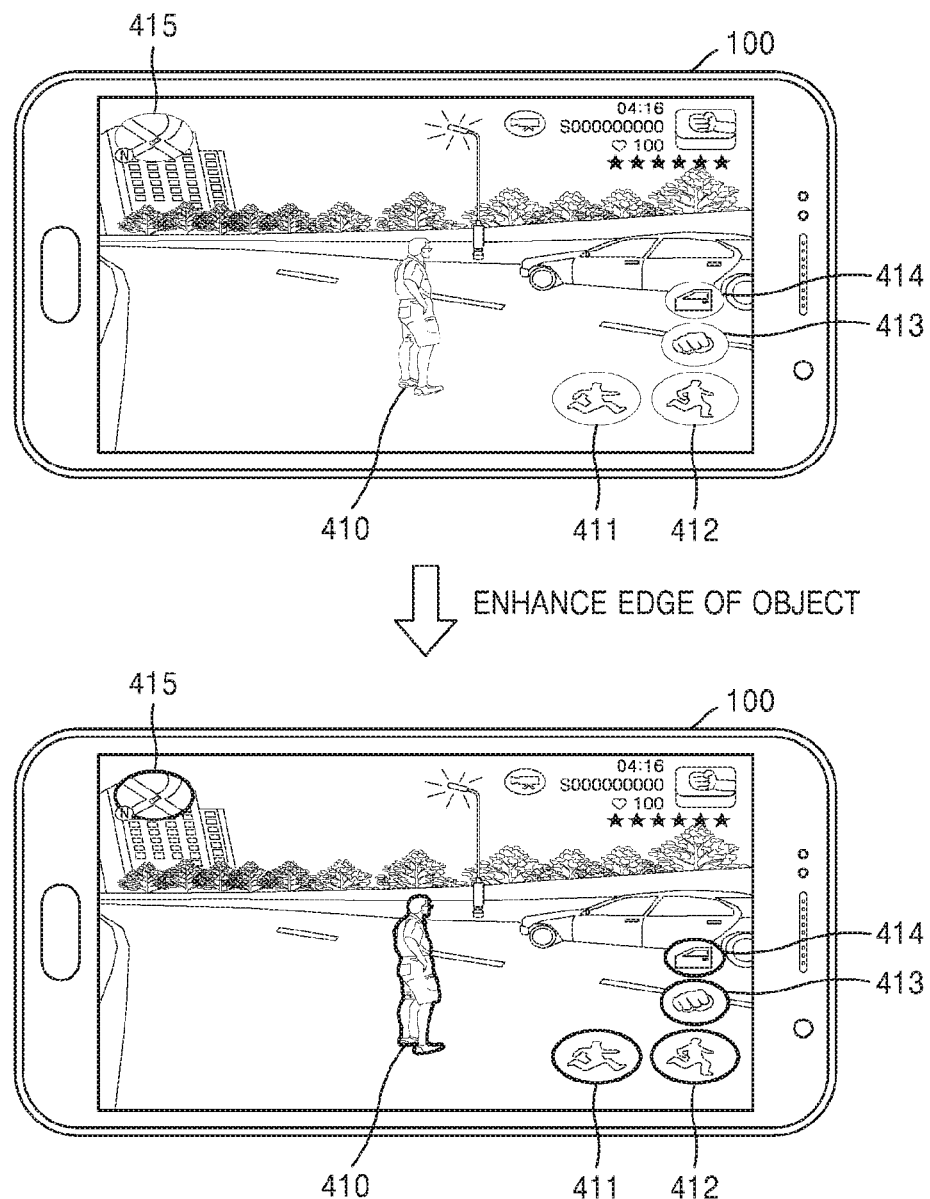
FIG. 4 illustrates a display of the multimedia apparatus before and after application of a filter that enhances an edge regarding an object present in an image, according to an exemplary embodiment.

FIG. 4 illustrates a display of the multimedia apparatus 100 before and after application of a filter that enhances an edge regarding an object present in an image, according to an exemplary embodiment.

The processor 220 according to an exemplary embodiment may additionally apply a filter for improving visibility to image data including obtained output pixel values. For example, the processor 220 may additionally apply a filter for improving visibility to image data having at least one among luminance, resolution, and precision adjusted.

For example, the processor 220 may additionally apply a filter for improving visibility to image data including output pixel values obtained based on an adjusted tone curve. The filter according to an exemplary embodiment may be an edge enhancement filter that enhances an edge regarding one or more objects present in image data. The filter may enhance an edge between an object and the background or an edge between an object and another object.

The filter according to an exemplary embodiment may be a Gaussian filter, a Sobel filter, or an N-tap interpolation filter (where N is a natural number). The filter according to an exemplary embodiment may determine a size and direction of an edge of an object and may apply an edge enhancement algorithm to image data according to the determined size and direction. However, the filter may be a filter that applies any other image processing algorithm for enhancing an edge, and thus, is not limited to the above example.

The processor 220 according to an exemplary embodiment may select one or more objects for edge enhancement from among various objects that are present in image data to be displayed. For example, when there is a game application being executed in the multimedia apparatus 100, the processor 220 may select one or more objects considered to show important information from among a plurality of objects that are present in image data to be displayed currently.

For example, the processor 220 may select a character 410, interfaces 411, 412, 413, and 414 capable of manipulating the character 410, and a mini-map 415 showing a location where the character 410 moves to, as objects for applying an edge enhancement filter. The processor 220 may apply, in a post-processing operation, a filter that enhances edges of the selected objects 410, 411, 412, 413, 414, and 415 to image data obtained based on an adjusted tone curve.

That is, even though output luminance of an image that is displayed based on the adjusted tone curve decreases, a decrease in visibility that a user feels may be reduced by applying a filter that enhances an edge of one or more objects during post-processing.

Figure 5:
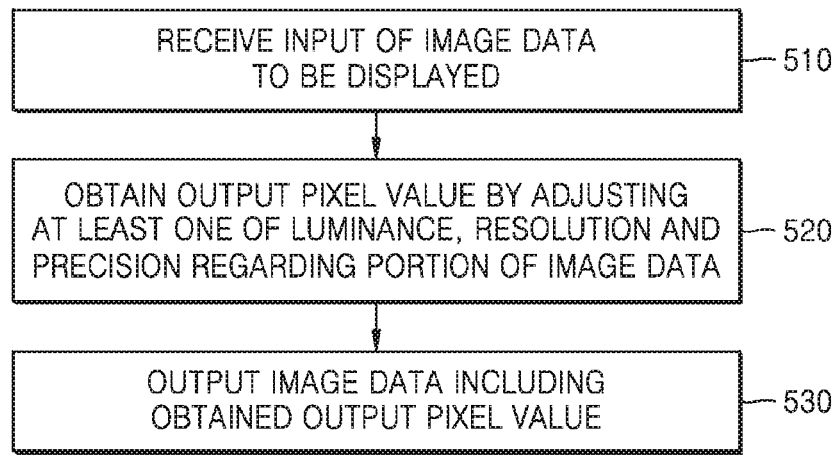
FIG. 5 is a flowchart of an image processing method for decreasing an amount of power consumed to display an image, according to an exemplary embodiment.

FIG. 5 is a flowchart of an image processing method for decreasing the amount of power consumed to display an image, according to an exemplary embodiment.

In operation 510, the image processing apparatus 200 may receive an input of image data to be displayed. According to an exemplary embodiment, the image data may include a plurality of pixel values. According to an exemplary embodiment, the image processing apparatus 200 may store input pixel values regarding pixels constituting an image frame to be displayed currently in a buffer. The image data according to an exemplary embodiment may include, in addition to the input pixel values, at least one of coordinates and the number of vertexes constituting an object of an image, texture data, properties, and geometric information.

In operation 520, the image processing apparatus 200 may obtain an output pixel value by adjusting, with regard to a portion of the inputted image data, at least one among luminance, resolution, and precision.

According to an exemplary embodiment, with regard to a partial region of an image to be displayed, the image processing apparatus 200 may decrease luminance. For example, compared with when a pixel value of an image that has low luminance decreases, a user feels a decrease in visibility less when a pixel value that has high luminance decreases, and accordingly, the image processing apparatus 200 may reduce a decrease in visibility by changing only an output pixel value corresponding to an input pixel value included in a partial luminance range, instead of uniformly decreasing output pixel values regarding an entire range of input pixel values.

According to an exemplary embodiment, with regard to a partial region of an image to be displayed, the image processing apparatus 200 may decrease a resolution. For example, the image processing apparatus 200 may select a partial region of an image, and with regard to the selected region, may decrease the resolution. According to an exemplary embodiment, with regard to the selected region, the image processing apparatus 200 may decrease a rendering resolution or texture resolution. The selected region may be a user non-gazing region, or a region or block that has a high luminance range, but is not limited thereto.

According to an exemplary embodiment, with regard to a partial region of an image to be displayed, the image processing apparatus 200 may decrease precision. For example, the image processing apparatus 200 may select a partial region of an image, and with regard to the selected region, may decrease precision. According to an exemplary embodiment, with regard to an object present in the selected region, the image processing apparatus 200 may decrease the number of vertexes constituting the object. The selected region may be a user non-gazing region, or a region or block that has a high luminance range, but is not limited thereto.

According to an exemplary embodiment, the image processing apparatus 200 may perform only one of luminance adjustment, resolution adjustment, and precision adjustment. In another exemplary embodiment, the image processing apparatus 200 may perform two or more of luminance adjustment, resolution adjustment, and precision adjustment. When the image processing apparatus 200 performs two or more of luminance adjustment, resolution adjustment, and precision adjustment, the image processing apparatus 200 may independently determine regions in an image that are targets for adjustment.

In operation 530, the image processing apparatus 200 may output image data including the obtained output pixel value. The image data including the output pixel value according to an exemplary embodiment may be stored in a buffer, and the image data stored in the buffer may be finally displayed on a screen of the multimedia apparatus 100.

Figure 6:
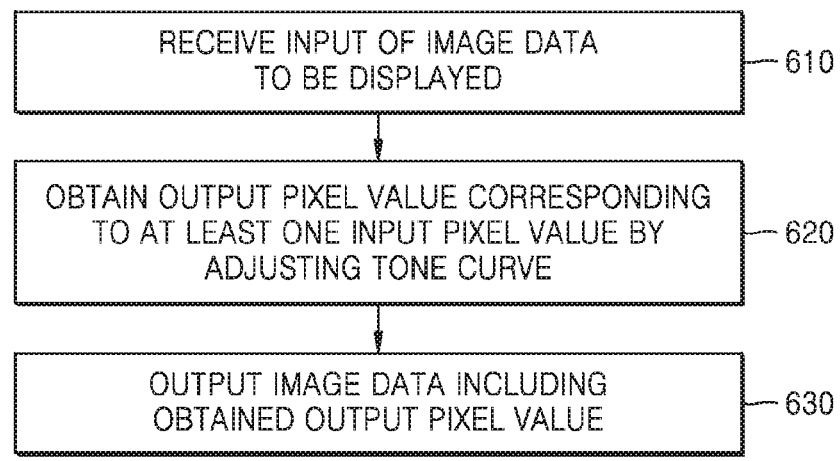
FIG. 6 is a flowchart of an image processing method for decreasing the amount of power consumed to display an image, according to an exemplary embodiment.

FIG. 6 is a flowchart of an image processing method for decreasing the amount of power consumed to display an image, according to an exemplary embodiment.

In operation 610, the image processing apparatus 200 may receive an input of image data to be displayed. According to an exemplary embodiment, the image data may include a plurality of pixel values. According to an exemplary embodiment, the image processing apparatus 200 may store input pixel values regarding pixels constituting an image frame to be displayed currently in a buffer.

In operation 620, the image processing apparatus 200 may adjust a tone curve denoting a correlation between input pixel values and output pixel values. Based on the adjusted tone curve, the image processing apparatus 200 may obtain, with regard to at least one of pixels included in the image data input in operation 610, an output pixel value corresponding to an input pixel value.

According to an exemplary embodiment, the image processing apparatus 200 may select the whole or a portion of a range of input pixel values of a tone curve denoting a correlation between input pixel values and output pixel values and thus may adjust the tone curve so that output pixel values that correspond to input pixel values included in the selected range may be less than the input pixel values. According to an exemplary embodiment, the image processing apparatus 200 may select a partial range from among a range of input pixel values of a tone curve, and thus, may change an output pixel value corresponding to an input pixel value included in the selected range and may not change an output pixel value corresponding to an input pixel value in a range that is not selected. A method of adjusting a tone curve has been described above with reference to FIG. 3.

According to an exemplary embodiment, the image processing apparatus 200 may select a tone curve that is used from among a plurality of tone curves previously stored in the image processing apparatus 200. According to an exemplary embodiment, the image processing apparatus 200 may differently select, according to a type of an application being currently executed or a type of image data that is displayed, a tone curve that is used from among a plurality of previously stored tone curves.

In operation 630, the image processing apparatus 200 may output image data including the obtained output pixel value. The image data including the output pixel value according to an exemplary embodiment may be stored in a buffer, and the image data stored in the buffer may be finally displayed on a screen of the multimedia apparatus 100.

Figure 7:
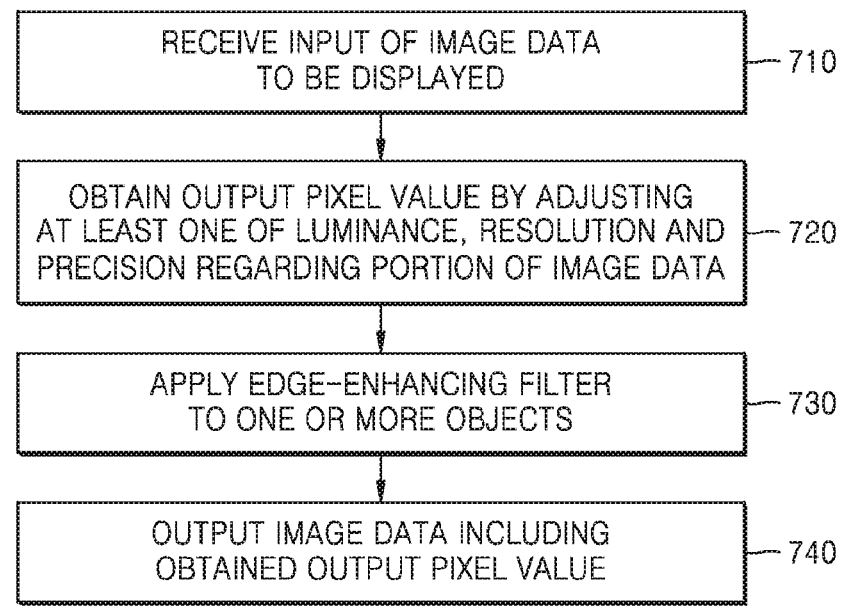
FIG. 7 is a flowchart of an image processing method for decreasing the amount of power that is consumed to display an image, according to an exemplary embodiment.

FIG. 7 is a flowchart of an image processing method for decreasing the amount of power consumed to display an image, according to an exemplary embodiment.

Operations 710, 720, and 740 respectively correspond to operations 510, 520, and 530 of FIG. 5.

In operation 730, the image processing apparatus 200 may apply a filter to image data obtained in operation 720. For example, the image processing apparatus 200 may additionally apply a filter for improving visibility to the image data obtained in operation 720. The filter according to an exemplary embodiment may be an edge enhancement filter that enhances an edge, for example, a boundary line, regarding one or more objects present in the image data. The filter may enhance an edge between an object and the background or between an object and another object.

The filter according to an exemplary embodiment may be a Gaussian filter, a Sobel filter, or an N-tap interpolation filter (where N is a natural number). The filter according to an exemplary embodiment may determine a size and direction of an edge of an object and may apply an edge enhancement algorithm according to the determined size and direction. However, the filter may be any filter that applies an image processing algorithm for enhancing an edge, and thus, is not limited to the above example.

In operation 730, the image processing apparatus 200 may select one or more objects for edge enhancement from among various objects that are present in image data to be displayed. For example, when there is a game application being executed in the multimedia apparatus 100, the image processing apparatus 200 may select one or more objects considered to show important information from among a plurality of objects that are present in image data to be displayed currently.

For example, even though an output luminance of an image that is displayed based on an adjusted tone curve decreases in operation 720, a decrease in visibility that a user feels may be reduced in a post-processing operation by applying a filter that enhances an edge of one or more objects in operation 730.

The image processing method can also be embodied as a computer-readable code on a non-transitory computer-readable recording medium. The non-transitory computer-readable recording medium is any data storage device that can store data which can be thereafter read by a computer system. Examples of the non-transitory computer-readable recording medium include read-only memory (ROM), random-access memory (RAM), CD-ROMs, magnetic tapes, floppy disks, and optical data storage devices. The non-transitory computer-readable recording medium can also be distributed over network coupled computer systems so that the computer-readable code is stored and executed in a distributed fashion.

It should be understood that exemplary embodiments described herein should be considered in a descriptive sense only and not for purposes of limitation. Descriptions of features or aspects within each exemplary embodiment should be considered as available for other similar features or aspects in other exemplary embodiments.

While exemplary embodiments have been described with reference to the figures, it will be understood by those of ordinary skill in the art that various changes in form and details may be made therein without departing from the spirit and scope as defined by the following claims.

What is claimed is:

1. An image processing apparatus comprising:
an input interface configured to input image data;
at least one processor configured to:
obtain an output pixel value by adjusting at least one selected from luminance, resolution, and precision regarding a portion of the image data,
adjust a tone curve denoting a correlation between input pixel values and output pixel values, and based on the adjusted tone curve, to obtain, with regard to at least one of pixels comprised in the image data, an output pixel value corresponding to an input pixel value, and
select a partial range having high luminance from among an entire range of input pixel values of the adjusted tone curve, thereby changing the output pixel value corresponding to the input pixel value in the selected range; and
an output interface configured to output image data comprising the obtained output pixel value to buffer storing the image data, and
wherein the selected partial range having high luminance comprises input pixel values equal to or greater than a predetermined reference value.

2. The image processing apparatus of claim 1, wherein the at least one processor is further configured to adjust the tone curve to be non-linear.

3. The image processing apparatus of claim 1, wherein the at least one processor is further configured to decrease a rendering resolution or a texture resolution regarding the portion of the image data.

4. The image processing apparatus of claim 1, wherein the at least one processor is further configured to decrease a number of vertexes constituting an object present in the portion of the image data.

5. The image processing apparatus of claim 1, wherein the at least one processor is further configured to apply a filter, for enhancing an edge of at least one object present in the image data, to the image data comprising the obtained output pixel value.

6. An image processing method comprising:
inputting image data;
obtaining an output pixel value by adjusting at least one selected from luminance, resolution, and precision regarding a portion of the image data; and
outputting image data comprising the obtained output pixel value, and
wherein the obtaining of the output pixel value comprises adjusting a tone curve denoting a correlation between input pixel values and output pixel values, and based on the adjusted tone curve, obtaining, with regard to at least one of pixels comprised in the image data, an output pixel value corresponding to an input pixel value,
wherein the obtaining of the output pixel value corresponding to the input pixel value of the at least one of pixels comprised in the image data comprises selecting a partial range having high luminance from among an entire range of input pixel values of the adjusted tone curve, thereby changing the output pixel value corresponding to the input pixel value in the selected range, and wherein the selected partial range having high luminance comprises input pixel values equal to or greater than a predetermined reference value.

7. The image processing method of claim 6, wherein the obtaining the output pixel value corresponding to the input pixel value of the at least one of pixels comprised in the image data comprises:

adjusting the tone curve to be non-linear; and obtaining, based on the non-linear tone curve, the output pixel value.

8. The image processing method of claim 6, wherein the obtaining the output pixel value comprises decreasing a rendering resolution or a texture resolution regarding the portion of the image data.

9. The image processing method of claim 6, wherein the obtaining the output pixel value comprises decreasing a number of vertexes constituting an object present in the portion of the image data.

10. The image processing method of claim 6, wherein the obtaining the output pixel value comprises applying a filter, for enhancing an edge of at least one object present in the image data, to the image data comprising the obtained output pixel value.

11. A non-transitory computer-readable recording medium having recorded thereon a program for performing, when executed by a computer, the image processing method of claim 6.

* * * * *